(No Model.)
E. WESTON.
CAN OPENER.
No. 497,698. Patented May 16, 1893.
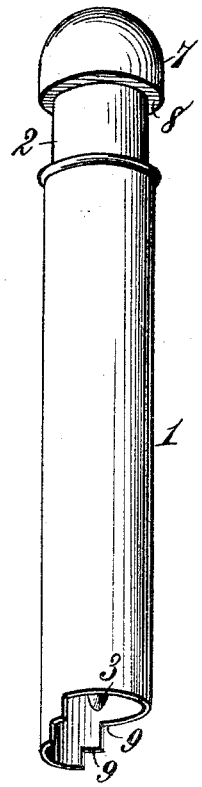
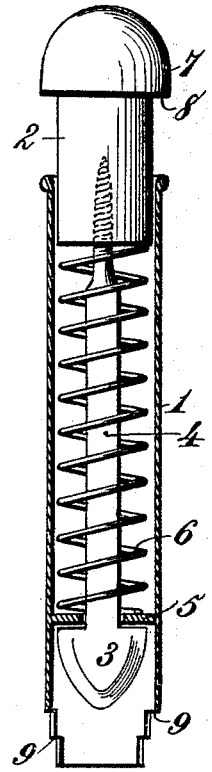
Witnesses,
Inventor:
Eugene Weston.

UNITED STATES PATENT OFFICE.

EUGENE WESTON, OF CLINTON, IOWA.

CAN-OPENER.

SPECIFICATION forming part of Letters Patent No. 497,698, dated May 16, 1893.

Application filed November 25, 1892. Serial No. 453,065. (No model.)

*To all whom it may concern:*

Be it known that I, EUGENE WESTON, a citizen of the United States, residing at Clinton, in the county of Clinton and State of Iowa, have invented new and useful Improvements in Can-Openers, of which the following is a specification.

This invention relates to improvements in can-openers and has for its object to provide a simple, inexpensive and efficient tool adapted to be readily and quickly operated for the neat removal of the tops of oyster and fruit cans without risk of injury to the contents of the can by a too deep penetration of the cutting blade.

The invention consists in the combination with a reciprocating plunger and attached cutting blade, of a tubular casing having its lower end provided with several series of graduated projections or steps adapted to bear upon and against the edge of a can and thereby regulate the degree of penetration, or the distance to which the cutting blade is forced into the can, when the plunger is depressed.

In the annexed drawings Figure 1 is a view of a can-opener embodying my invention. Fig. 2 is a vertical or longitudinal section of the same.

Referring to the drawings the numeral 1 designates an open ended cylindrical casing which may be made of any suitable metal. Within this cylindrical casing is placed a plunger 2 which carries at its lower end a two edged cutting blade 3 that may have a suitable shank 4 by which it is securely attached to the plunger. Near the lower end of the tubular casing is a centrally perforated diaphragm 5 through which the shank of the cutting blade is passed. This diaphragm 5 serves as a lower bearing for a spiral spring 6 by which the plunger 2 and attached cutting blade 3 are normally supported.

The upper end of the plunger 2 is provided with a knob shaped operating handle 7 the lower edge of which projects laterally to form an annular shoulder 8 that is adapted to come in contact with the upper end of the cylindrical casing and thereby serve as a stop or buffer against the downward movement of the plunger and cutting blade. The cutting blade 3 is wholly below the diaphragm 5 the lower surface of which serves as a stop for the recoil of the blade when the plunger is relieved of pressure.

At its lower end the cylindrical casing 1 is provided with several series of graduated rectangular projections or steps 9 that are preferably integral with one side of said casing, the other side of the casing end being cut away in a suitable manner to form said steps or projections. The cutting blade 3 is preferably extended across the center of the circle formed by the lower end of the cylindrical casing 1 and the stepped projections 9 extend in semi-circular form nearly half way around the lower end of the casing and are gradually diminished in length from end to end. These graduated projections or steps 9 may be in two or more series as preferred and are adapted to bear upon and against the top of a can at its edge and thus serve as a graduated stop to limit and control the thrust of the cutting blade into the can in the operation of cutting out and removing its top.

The knife or cutting blade 3 is normally retracted and supported within the cylindrical casing 1 by the action of the spring. When it is desired to apply the implement to its intended use for cutting out and removing the top of a can without exposing the contents to injury the lower end of the casing will be placed on or over the top of the can with the graduated projections 9 turned to the outside of the edge of the can top and in such position that the end of the cylinder or one of its series of stepped projections will be in firm bearing contact with the top of the can. A succession of blows on the knob or handle of the plunger will now cause the cutting blade to reciprocate, aided by recoil of the spring 6, and the can being meanwhile rotated, or a progressive movement imparted to the implement around the edge of the can top, the can will be quickly and neatly opened without any damage or cutting of its contents. By employing either an inner or outer series of the graduated projections 9 as a rest or support for the implement while cutting out the can top the thrust of the cutting blade can be regulated according to the thickness of the material to be severed; and while the cutting of the can top is being accomplished the steps or projections in engagement with the edge of the can will also serve as a guide to insure a neat and regular cut around the whole of the can or other similar package.

Another purpose of the graduated projections is to facilitate the cutting out of the can top at varying distances from the edge or side of the can. For instance, the upper steps or projections nearest the blade serve as guides for the instrument in cutting out the whole of the top close inside of the sides of the can; some cans, however, have unusually thick sides or a thick edge around the top of the can and then the lower steps or projections can be used and the cutting done farther in from the side of the can. The steps or graduated projections 9 can thus be used to regulate or control the distance of cutting from the edge of the can and also the degree of penetration permitted to the cutting blade.

What I claim as my invention is—

1. In a can-opener, the combination with a reciprocating plunger and attached cutting blade, of a cylindrical casing having its lower end provided with graduated projections or steps adapted to bear firmly against the top of a can at its edge and serve as stops to limit and control, the distance of cut from the edge of the can and the penetration or thrust of the cutting blade, substantially as described.

2. In a can-opener, the combination with a reciprocating plunger and attached cutting blade, of a cylindrical casing having its lower end provided with graduated projections or steps arranged in series and adapted to serve as stops to limit the thrust or penetration of the cutting blade, and the distance of cut from the edge of the can, and a spring inclosed in said casing, substantially as described.

In testimony whereof I have hereunto set my hand in presence of two subscribing witnesses.

EUGENE WESTON.

Witnesses:
M. J. POWERS,
JOHN JACKSON.